June 18, 1957 L. DIETCH 2,796,552

DEFLECTION COIL ISOLATION CIRCUITRY

Filed May 2, 1955

INVENTOR.
LEONARD DIETCH
BY [signature]
ATTORNEY

United States Patent Office 2,796,552

Patented June 18, 1957

2,796,552

DEFLECTION COIL ISOLATION CIRCUITRY

Leonard Dietch, Haddonfield, N. J., assignor to Radio Corporation of America, a corporation of Delaware Application May 2, 1955, Serial No. 505,166

4 Claims. (Cl. 315—27)

The invention relates to circuitry for applying deflection waves to the deflection system windings arranged about the neck of a cathode ray tube to deflect the electron beam electromagnetically, and it particularly pertains to such circuitry which also affords substantial isolation of the deflection system windings one from the other.

In present television practice, an image is formed on the face of the cathode ray tube or kinescope by intensity modulating an electron beam in accordance with image information signals to vary the light point by point over a raster which is formed on the fluorescent screen deposited on the internal surface of the face of the kinescope by deflecting the electron beam in two directions normal with respect to each other. Deflection of the electron beam is accomplished magnetically by applying sawtooth waves of current to the deflection system windings which are mounted in a mechanical yoke arranged about the neck of the kinescope. In such electromagnetic deflection systems a certain amount of distributed capacity exists between the horizontal and vertical deflection system windings. This capacity represents a relatively large portion of the effective fly-back tuning capacity of the horizontal deflection system usually employed in conventional television receivers. This distributed capacity tends to degrade the performance of the receiver, especially as to lengthened retrace time, reduced beam deflection power available, and nonlinearity of deflection. While this problem is serious in the design of black-and-white television receivers, the design requirements of color television receivers, particularly that of the vertical electrical centering circuitry, are such that this distributed inter-coil capacity must be minimized in order to attain an economical design.

An object of the invention is to provide an improved circuit arrangement effectively isolating horizontal and vertical deflection system windings of cathode ray tube arrangements.

Another object of the invention is to simplify the deflection circuitry of television receivers and at the same time improve the performance thereof.

A further object of the invention is to reduce the effective inter-coil or interwinding distributed capacity between the horizontal and vertical deflection system windings.

According to the invention the vertical deflection system winding is effectively isolated from the horizontal reference alternating potential by effectively applying the vertical centering current to the vertical deflection system winding through windings on the output transformer of the horizontal deflection translating circuit to which the horizontal deflection system windings are connected. More specifically this is accomplished by winding a portion of the horizontal deflection circuit output transformer with a trifilar winding, one conductor of which forms a part of the horizontal deflection wave output winding and the other two conductors of the trifilar winding form the means for isolating the vertical deflection system windings from the horizontal reference alternating potential. Effectively the interwinding capacity across the horizontal deflection system winding is reduced to half the value obtained with the conventional deflection systems.

In order that the practical aspects may be more fully appreciated and readily obtained in practice, a specific circuit arrangement according to the invention, given by way of example only, is described with reference to the accompanying drawing in which.

Figure 1:
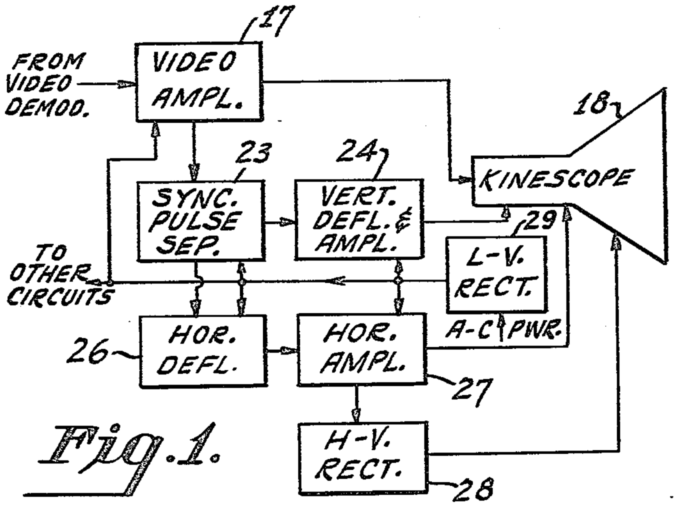
Fig. 1 is a functional diagram of portions of a television receiver incorporating circuitry according to the invention.

Referring to Fig. 1, there is shown a functional diagram of a television receiver having conventional portions and portions incorporating circuitry according to the invention. In such a receiver television signals appearing at an antenna are applied to a radio frequency amplifying circuit, and the output therefrom is applied along with a wave from a local oscillations generating circuit to a frequency converting circuit. The output of the frequency converting circuit is applied to an intermediate frequency (I.-F.) amplifying circuit which may be an individual picture I.-F. amplifying circuit or one amplifying both picture and sound intermediate frequency signals. A demodulating circuit is coupled to the picture I.-F. amplifying circuit for deriving the video wave from the television signals. The detected video signals are amplified in a video amplifying circuit 17 and thereafter applied to the input circuit of an image reproducing device or kinescope 18. Sound signals are derived from the frequency converting circuit, or the I.-F. amplifying circuit, or the demodulating circuit, for further processing in the sound I.-F. amplifying circuit, an aural signal discriminating circuit, an audio frequency amplifying circuit and application to a transducer, usually in the form of a speaker. The output of the video amplifying circuit 17 is also applied to a synchronizing pulse separating circuit 23 to separate the synchronizing pulses from the image information for application of the vertical synchronizing pulses to a vertical deflection wave generating and amplifying circuit 24 and application of the horizontal pulses to a horizontal deflection wave generating circuit 26 and amplifying circuit 27. The vertical deflection wave generating and amplifying circuit 24, the horizontal deflection wave amplifying circuit 27, and a high voltage generating circuit 28 coupled to the horizontal deflection amplifying circuit 27 are utilized to apply vertical and horizontal deflection waves and ultor potential to the kinescope 18. A low voltage power supply 29, usually in the form of a rectifier operating from the alternating current (A.-C.) power line, is provided to supply direct energizing potential to the vertical and horizontal deflection wave amplifying circuits 24, and 27, the horizontal deflection wave generating circuit 26, the synchronizing pulse separating circuit 23 and all other circuits requiring direct potential energization. An A.-G.-C. amplifier and distribution network is coupled to the synchronizing pulse separating circuit 23 or to the video amplifying circuit 17, to supply control potential to the desired ones of the circuits previously mentioned. Usually the R.-F. and the I.-F. circuits at least are so supplied.

According to the invention vertical deflection centering current is obtained from circuitry in the low voltage rectifier 29 and applied through the circuitry of the vertical deflection amplifier 24 and a horizontal deflection wave amplifier 27 to the vertical deflection system windings associated with the kinescope 18.

Figures 2, 4:
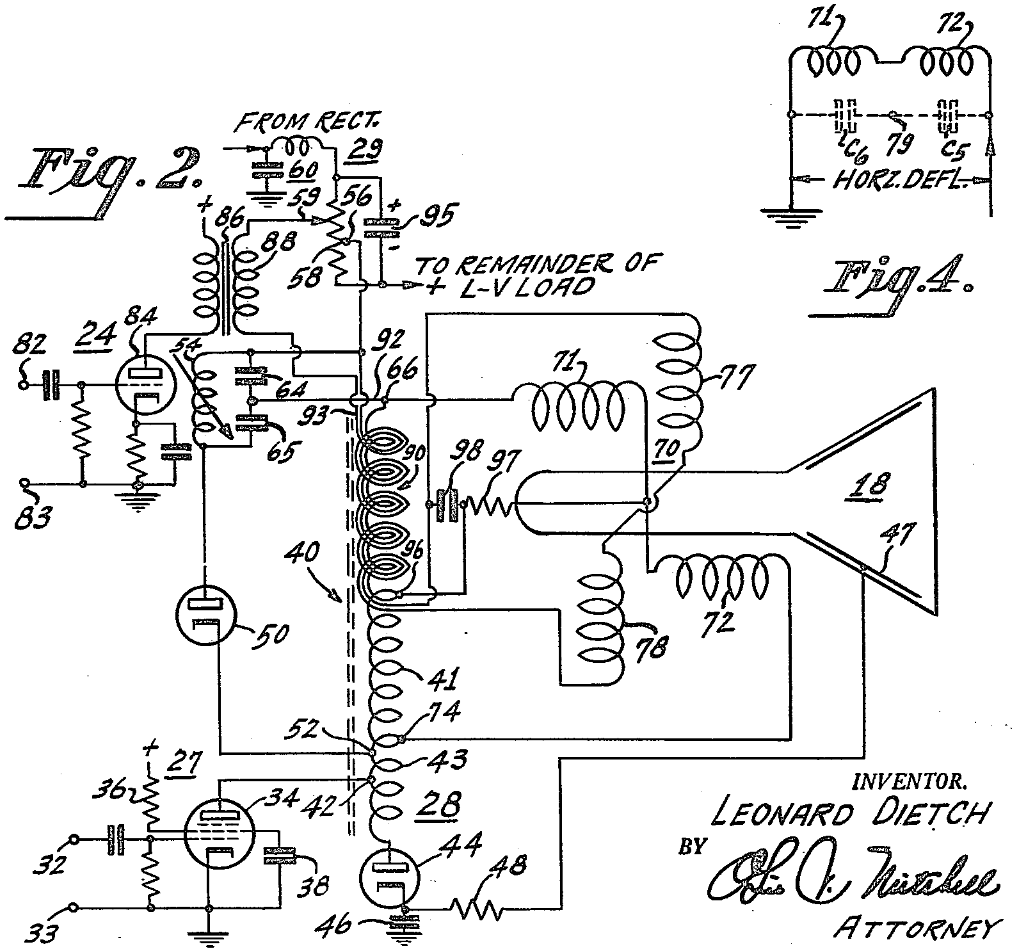
Fig. 2 is a schematic diagram of a television receiver circuitry for forming the functions according to the invention as outlined in Fig. 1.

Referring to the schematic diagram of Fig. 2, a sawtooth deflection wave from a horizontal deflection wave oscillator (not shown), which may be entirely conventional, is impressed on the control grid of a horizontal output amplifying electron discharge device shown here as a beam power pentode amplifying tube 34 at the horizontal sawtooth input terminals 32, 33. The screen grid of the pentode 34 is energized by means of a resistor 36 connecting the screen grid to a point of positive operating potential and is bypassed to a point of fixed reference potential, shown as ground, by means of a capacitor 38. Deflection waves from the output amplifying tube 34 are applied to an output transformer 40 which includes a primary winding comprising a conductor 41 to one terminal 42 of which the anode of the amplifying tube 34 and a high voltage winding 43 are connected. To the high voltage winding 43 there is connected the more or less conventional fly-back type high voltage generating circuit comprising a high voltage rectifying device, shown as a high vacuum diode electron discharge device 44, for rectifying the high voltage fly-back pulses appearing in the high voltage winding 43 and a high voltage capacitor 46 for storing the energy in the rectified pulses to provide the ultor of the kinescope 18 with a continuous high voltage through a series resistor 48. Various oscillations which appear in the windings of the output transformer 40 are damped out by a damping device shown as a high vacuum diode electron discharge tube 50 having a cathode connected to a terminal 52 on the low voltage winding conductor 41 and an anode connected through a variable inductor 54, serving as a linearity control, to a point of direct energizing potential at a center tap 56 on a potentiometer 58 connected between the output of a filter network 60 and the lead to the remainder of the low voltage load of the receiver. The input of the filter network 60 may be connected to a conventional low power rectifier, not shown, having a transformer and a rectifier tube for converting the relatively low alternating potential obtained from the local power line into low direct energizing voltage. A pair of capacitors 64, 65 are connected in series across the linearity control 54 and the junction between these capacitors is connected to the terminal of the conductor 41 of the transformer 40 in a known energizing potential boosting circuit for applying to the anode of the horizontal deflection wave amplifying tube 34 an energizing potential approximately twice the value at the terminal 56 on the low voltage rectifier.

A deflection system 70, comprising a horizontal deflection system winding of two sections 71, 72 connected across the conductor 41 between the A.-C. ground terminal 66 and a tap 74, and a vertical deflection system winding comprising two sections 77, 78, is mounted along with the horizontal deflection system winding 71, 72 in a mechanical yoke arranged about the neck of the kinescope 18 in conventional fashion. The vertical deflection system winding 77, 78 is arranged to be energized by waves from vertical deflection wave generating circuitry which may be entirely conventional. A vertical deflection sawtooth voltage wave from such generating circuitry is applied at the input terminal 82, 83 to the grid and cathode electrodes of a vertical deflection wave amplifying or translating tube 84. By means of a transformer 86 connected to the anode of the vertical deflection wave translating or amplifying tube 84, a sawtooth vertical deflection current wave is induced in the output winding 88 in suitable form for application directly to the vertical deflection system winding 77, 78.

Figure 3:
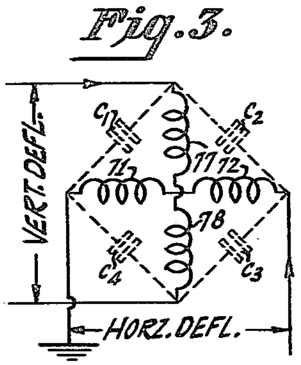
Figs. 3 and 4 are equivalent circuit diagrams useful in explaining the operation of the circuit of Fig. 2 according to the invention.

Direct vertical centering current is applied to the vertical deflection winding 77, 78 by connecting the vertical deflection wave transformer output winding 88 in series with a portion of the potentiometer 58 as determined by the adjustment of the potentiometer arm 59. If the vertical centering current source which is the portion of the potentiometer 58 and which is at A.-C. ground or reference potential were connected directly to the vertical deflection system winding 77, 78 a substantial intercoil capacitance would be presented across the horizontal deflection winding 71, 72. This is best explained with reference to the equivalent circuit diagrams shown in Figs. 3 and 4. In the diagram shown in Fig. 3 the intercoil or interwinding capacitances are represented by lumped capacitors $C_1$, $C_2$, $C_3$ and $C_4$ connected between the ends of the windings, although it is to be understood that the intercoil capacity is actually distributed along the coils. In television broadcasting under the presently existing regulations of the Federal Communications Commission, the vertical deflection rate is 60 cycles per second and the horizontal deflection wave is 15.75 kc. Since the vertical deflection system winding is of relatively low impedance at the horizontal deflection frequency, the entire vertical deflection system winding may be considered to be at the same horizontal frequency potential without introducing substantial error due to the period of the loop circuit in which the vertical deflection system windings are included. With this in mind the diagram of Fig. 3 can be reduced to that shown in Fig. 4, wherein the distributed capacity across the horizontal deflection system winding 71 and 72 is represented by two lumped capacitance elements $C_5$ and $C_6$ connected in series. The junction point 79 between the lumped capacity elements $C_5$ and $C_6$ represents the vertical deflection system winding potential at horizontal frequency, which as can be seen is a point of potential above ground, or "floating." It can also be seen from this diagram, that if the vertical deflection winding 77, 78 were brought to ground with respect to potentials at the horizontal deflection frequency, as is done by applying a portion of the low voltage supply current to the vertical deflection system windings for vertical electrical centering, the point 79 would be grounded across the lumped capacitance element $C_6$ effectively leaving the rest of the lumped capacitance represented by the lumped capacitor $C_5$ across the horizontal deflection system winding 71, 72. Almost always the vertical coil horizontal potential point 79 lies at the capacity midpoint; that is, the lumped capacitance $C_5$ equals the lumped capacitance $C_6$. Therefore when the vertical deflection system winding is brought to ground for horizontal frequency potential, the resultant capacity across the horizontal deflection system winding 71, 72, is twice the normal value obtained when the vertical deflection system windings are "floating" at horizontal deflection frequency potential.

According to the invention the vertical deflection system winding 77, 78 is raised above the horizontal frequency A.-C. ground by means of a trifilar winding 90 on the horizontal output transformer shown in Fig. 2. The trifilar winding 90 is constituted by three conductors 41, 92 and 93 of which the first conductor 41 is an extension of or a portion of the low voltage winding of the transformer 40. The trifilar winding 90 extends for substantially half of the total turns between the terminals 66 and 74 (across which terminals the horizontal deflection system winding 71, 72 is connected) so that terminals of the conductors 92, 93 to which the vertical deflection system winding 77, 78 is connected are both at a horizontal deflection potential above the reference potential or ground substantially corresponding to the midpoint potential of the horizontal deflection system winding (thus, substantially corresponding to the potential obtaining when the vertical deflection system winding is "floating" as illustrated in Figure 4). The terminal 66 is at A.-C. ground potential with respect to the horizontal frequency energy and the electrically adjacent terminals of the trifilar conductors 92 and 93 are also therefore at A.-C. ground potential so that an electric connection is readily made between the transformer output winding 88 and the center tap 56 of the potentiometer 58 to the conductors 92, 93, which are also at ground potential with respect to the horizontal deflection frequency.

Vertical deflection wave current passing through the conductors 92, 93 of the horizontal transformer trifilar winding 90 will have no effect on the horizontal deflection wave circuit since equal and opposite magnitudes of current exist in the two conductors.

The resistance of the two conductors 92, 93 causes a small loss of vertical deflection, but this is more than offset by the fact that approximately 1500 volts of horizontal pulse which would be presented across the output winding 88 of the vertical output transformer 86, introducing considerable interlace difficulties, is eliminated with the circuitry according to the invention. A definite improvement in interlaced characteristics was observed in the receiver constructed when compared with a receiver using the prior art arrangement.

Preferably the center tap 96 of the conductor 41 between the deflection system output terminals 66, 74 is connected through a resistor 97 to the junction between the two sections 71, 72 of the horizontal deflection system winding in order to reduce raster distortion brought about by slight inequalities of the two portions of the horizontal deflection system windings and the like. One terminal of the vertical deflection system winding 77, 78 is coupled to the center tap 96 by means of a capacitor 98 in order to aid in maintaining the vertical deflection system winding at the horizontal potential point.

The problem of obtaining a transformer 40 with a trifilar winding 90 is not difficult in practice, since deflection transformers of the type described are normally wound with several enamelled conductors handled as though the transformer winding comprised a winding of stranded wire except for the fact that the individual conductors are electrically separated from each other by the insulating enamel. Where three or more conductors are thus employed, it is only necessary that the conductors be terminated and brought out after the proper number of turns have been wound, and where only two conductors are normally employed a third conductor must be added for a relatively short portion of the winding. All in all, the savings of a separate set of choke coils and other components for raising the potential of the vertical deflection system winding 77, 78 with respect to the horizontal deflection frequency will more than offset the additional cost of the transformer winding.

In addition the vertical centering bypass capacitor 95 may be a relatively low capacity polarized electrolytic bypass which is relatively inexpensive as compared to a nonpolarized high capacity bypass capacitor as is required in the prior art arrangements. In addition a receiver designed for color television image reproduction along the lines shown in Fig. 2 and using the pertinent component parts values as listed below gave performance that was a considerable improvement over the prior art arrangements.

| Ref. No. | Component | Type or value |
|---|---|---|
| 34 | Horizontal amplifier tube | 6CB5. |
| 50 | Damping tube | 6BL4. |
| 54 | Linearity control | 1 mh. |
| 58 | Vertical centering potentiometer | 20 ohms. |
| 64 | B boost capacitor | 0.1 mf. |
| 65 | do | 0.27 mf. |
| 71, 72 | Horizontal deflection winding | 7 ohms. |
| 77,78 | Vertical deflection winding | 60 ohms. |
| 94 | Vertical centering bypass | 1,000 mf. 6 v. |
| 97 | Balancing resistor | 4,700 ohms. |
| 98 | Blocking capacitor | 0.22 mf. |

The invention claimed is:

1. An electromagnetic cathode ray tube beam deflection circuit arrangement including, a deflection wave transformer having one winding comprising at least one conductor and another winding comprising at least three trifilar wound conductors one of which is an extension of said one winding, one deflection system winding mounted in a yoke arranged about the beam path within said cathode ray tube and connected across a portion of said one winding and said extension thereof, another deflection system winding mounted in said yoke and connected to like electrical terminals of two other conductors of said trifilar winding, means to induce deflection wave currents in said windings, and means connected to the remaining terminals of said two conductors to induce currents of another deflection wave.

2. An electromagnetic cathode ray tube beam deflection circuit arrangement including, a deflection wave transformer having a trifilar winding of three conductors one of which is extended, means to induce deflection currents of a given deflection wave in said winding, one deflection system winding mounted in a yoke arranged about the beam path of said cathode ray tube and connected to points on said one conductor to derive currents of said given deflection wave for sweeping said beam of electrons in a given direction, means to apply currents of another deflection wave to electrically adjacent terminals of the remaining conductors of said trifilar winding, and another deflection system winding mounted in said yoke and connected to the other terminals of said remaining conductors to derive currents of said other deflection wave for deflecting said beam of electrons in another direction.

3. An electromagnetic cathode ray tube beam deflection circuit arrangement, including a deflection wave transformer having a trifilar winding of three conductors one of which is extended, means to induce deflection currents of a given deflection wave in said winding, one deflection system winding connected to points on said one conductor to derive currents of said given deflection wave, means to apply currents of another deflection wave to electrically adjacent terminals of the remaining conductors of said trifilar winding, and another deflection system winding connected to the other terminals of said remaining conductors.

4. A circuit arrangement for electromagnetically deflecting and centering the electron beam of a kinescope in a television image reproducing circuit, including a horizontal deflection wave translating circuit, a deflection wave transformer having a trifilar winding of three conductors one of which is extended and coupled to said horizontal deflection wave translating circuit, a deflection system winding having two portions one of which is connected across said one conductor of said trifilar winding and the other of which is connected across a portion of the extension of said one conductor having substantially the same potential amplitude as that of said one portion, a vertical deflection wave translating circuit having an output transformer winding connected to electrically adjacent terminals of the other two trifilar wound conductors, a vertical deflection system winding connected to the other terminals of said other two trifilar wound conductors, a resistor connected between the junction of said portions of said horizontal deflection system winding and a point on said one conductor intermediate the connections to said horizontal deflection system winding, and a capacitor connected between said intermediate point and one terminal of said vertical deflection system winding, a vertical centering current potentiometer comprising a resistance element having one terminal connected to a source of positive potential, another terminal connected to a point of positive potential of lesser value, a center tap connected to one terminal of one of said two other trifilar conductors electrically adjacent said one terminal.

References Cited in the file of this patent

UNITED STATES PATENTS 2,320,551 Bahring ---------------- June 1, 1943